United States Patent [19]

Mackenzie

[11] Patent Number: 5,173,998
[45] Date of Patent: Dec. 29, 1992

[54] GRAB HOOK FOR ATTACHMENT TO A CHAIN TO PROVIDE PARTIAL LINK ADJUSTMENT, AND METHOD OF USE THEREOF

[76] Inventor: Douglas J. Mackenzie, P.O. Box 622, Redwater, Alberta, Canada, T0A 2W0

[21] Appl. No.: 826,974

[22] Filed: Jan. 28, 1992

[51] Int. Cl.⁵ .............................................. A44B 21/00
[52] U.S. Cl. .................................. 24/273; 24/68 CT; 24/69 T; 294/82.1
[58] Field of Search .............. 24/273, 68 CD, 68 CT, 24/68 T, 68 TT, 69 TT, 70 CT, 530, 265 H; 294/26, 81.56, 82.1, 901; 254/DIG. 14

[56] References Cited

U.S. PATENT DOCUMENTS

| | | | |
|---|---|---|---|
| 357,810 | 2/1887 | Baynes | 24/273 |
| 619,237 | 2/1899 | Soule . | |
| 690,645 | 1/1902 | Ford | 24/273 |
| 892,076 | 6/1908 | Olson | 24/68 CT |
| 1,449,975 | 3/1923 | Decker | 294/82.1 |
| 1,656,776 | 1/1928 | Davidson | 24/68 CT |
| 1,911,194 | 5/1933 | Jenkins et al. . | |
| 2,184,812 | 12/1939 | Hendrix . | |
| 2,615,217 | 10/1952 | Stuller | 24/69 TT |
| 2,630,609 | 3/1953 | LeBus . | |
| 2,759,235 | 8/1956 | Rea . | |
| 3,149,821 | 9/1964 | Wallace | 24/69 T |
| 3,366,997 | 2/1968 | Lesley | 24/68 CT |
| 3,988,005 | 10/1976 | Mooney et al. . | |
| 4,946,216 | 8/1990 | Demick | 296/63 |

FOREIGN PATENT DOCUMENTS 0723842 12/1965 Canada .............................. 24/68 CT

OTHER PUBLICATIONS

Aircraft Tie-Down Hook/Cargo-Type CCM BIG Orange), One Sheet, No Date.

*Primary Examiner*—Victor N. Sakran
*Attorney, Agent, or Firm*—Anthony R. Lambert

[57] ABSTRACT

A hook for gripping chain is asymmetrical so that the effective chain length can be adjusted to a part link tightness. The attachment end of the hook is offset from the plane of the hook end, which includes the slot for receiving a link of a chain. If the chain enters from one side of the hook, the chain and hook have a different angle than when the chain enters from the other side of the hook. The resulting change in angle and hence the way the hook interferes with the chain changes the length of chain required for the chain to reach the slot.

3 Claims, 4 Drawing Sheets

GRAB HOOK FOR ATTACHMENT TO A CHAIN TO PROVIDE PARTIAL LINK ADJUSTMENT, AND METHOD OF USE THEREOF

FIELD OF THE INVENTION

This invention relates to hooks for attaching to chains, particularly for but not limited to use with load binders, and to a method of using the grab hook.

BACKGROUND AND SUMMARY OF THE INVENTION

A load binder is a device that is used to tighten a chain or cable to secure a load on a vehicle. A lever type load binder 11 is illustrated in FIG. 1. Movement of the lever 13 in the direction of the arrow shortens the distance between the two grab hooks 15 and 17. The lever 13 snaps over center at the end of its stroke and the chain tension holds the load binder closed. The grab hooks 15 and 17 are designed to grab chain links of a chain (not shown).

When load binders are tightened the degree of tension is in part determined by the distance between the links in the chain. Typical hooks used on load binders have a longitudinal slot through which one chain link passes with little clearance. Since adjacent chain links are at right angles, more or less, to each other, the next chain link cannot pass through the slot and the chain is held by the hook. The load binder may grasp the chain at any link and may be tightened. Typical chains are made of links that are all the same size, and so the tightness can be adjusted to the chain link that is closest to the tightest point the load binder can be tightened to. However, this may result in nearly a full chain link of looseness, if the binder cannot quite be tightened to the next link.

The inventor has proposed a solution to this problem in which the chain may be tightened in partial link increments instead of full link increments. The invention uses the principle that the length of the chain that is used up depends on the angle of the slot in the hook and interference between the chain and the body of the hook. The slot may be taken to lie in a plane. Over small angles, the closer a perpendicular to this plane is to being parallel to the direction of tightening, the less the amount of chain required to reach into the slot. Hence the invention provides a hook that is asymmetrical (the attachment end is offset from the hook end) so that when the chain enters the hook from one side it requires less length of chain than when it enters the other side. By appropriate choice of the amount of offset or asymmetry, the change in length required can be set to part of a chain link, preferably half a link.

While the invention has been described for use with a chain and load binder, it should be observed that the hook has utility to link anything that may be attached to the hook on one end with a chain on the other end.

BRIEF DESCRIPTION OF THE DRAWINGS

There will now be described a preferred embodiment of the invention, with reference to the drawings, by way of illustration, in which like numerals denote like in which.

DETAILED DESCRIPTION OF PREFERRED EMBODIMENTS

Figure 1:
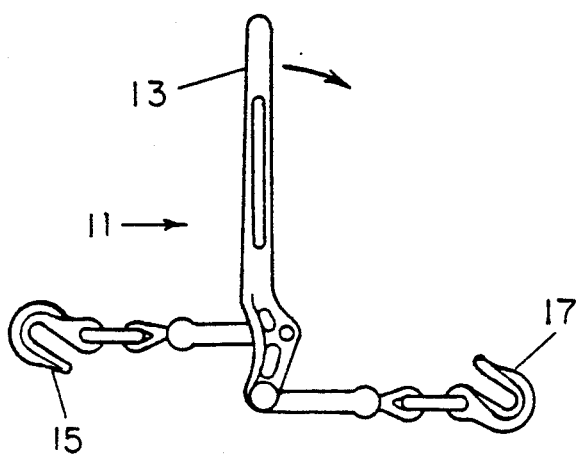
FIG. 1 is a side view of a prior art load binder.
Figure 2:
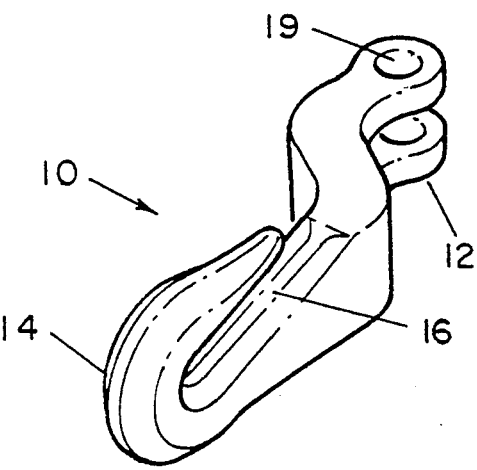
FIG. 2 is a perspective view of a hook according to the invention.
Figure 3:
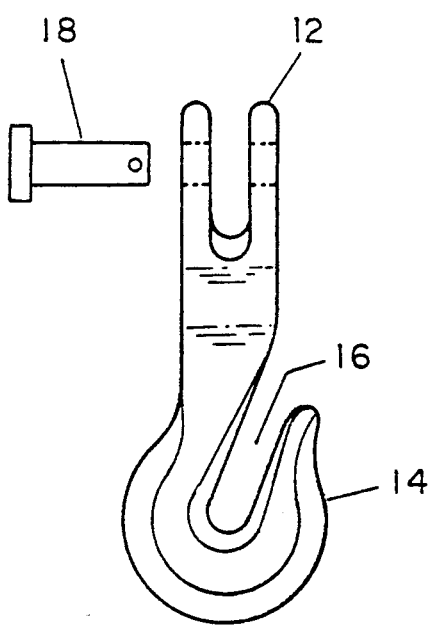
FIG. 3 is a side view of the hook of FIG. 2.
Figure 4:
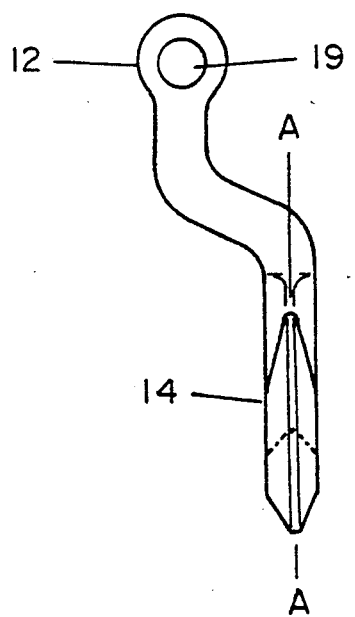
FIG. 4 is an end view of the hook of FIG. 2.

Referring to FIGS. 2, 3 and 4 there is shown a grab hook 10 according to the invention. The hook 10 has an attachment end 12 and a hook end 14. The attachment end 12 is of the clevis type, which is readily attachable or detachable to another chain or like member by inserting or removing pin 18 from the eyes 19. The hook end 14 defines a plane A which is in the plane of the sheet of the drawing in FIG. 3 and perpendicular to the sheet as shown in FIG. 4. The hook end 14 includes a slot 16 that is in the plane of the hook. The plane of the hook end 14 may be considered to be defined by the slot 16. The longitudinal axis of the slot lies in the plane A (see FIG. 4) and the lateral dimension of the slot also lies in the plane A (see FIG. 3). As clearly shown in FIG. 4, the attachment end 12 is offset from the plane A of the hook.

Figure 5:
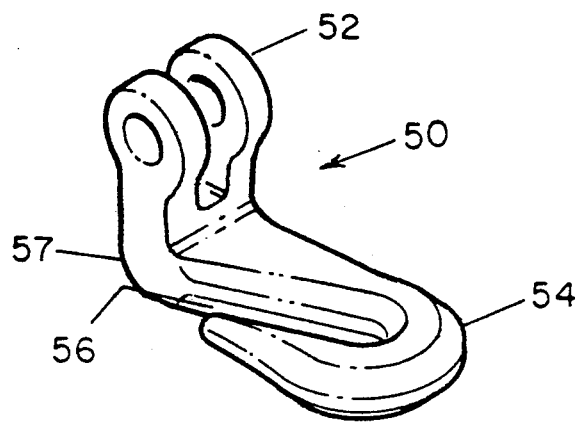
FIG. 5 is a perspective view of a further embodiment of a hook according to the invention.

A further embodiment of the invention is shown in FIG. 5. The hook 50 includes a hook end 54 and an attachment end 52. The hook end 54 defines a plane in which lies a slot 56. The attachment end 52 lies outside of the plane of the hook. The shank 57 of the hook is formed in this case with a single curve. Other configurations of the shank may be used to obtain the desired offset. However, the double curve shown in FIGS. 2, 3 and 4 is preferred. Use of a single curve over the double curve is not preferred because high bending stresses require the shank to be thicker near the curve, which complicates the manufacture of the hook.

Figure 7:
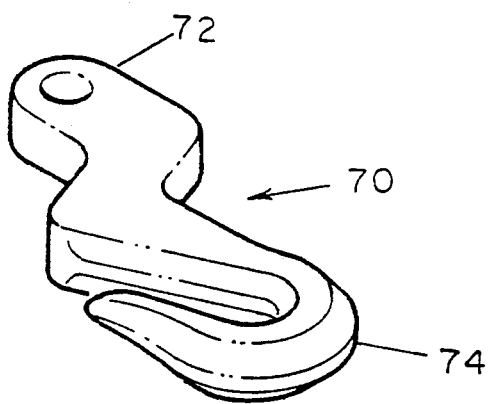
FIG. 7 is a perspective view of a further embodiment of a to the invention.
Figure 6:
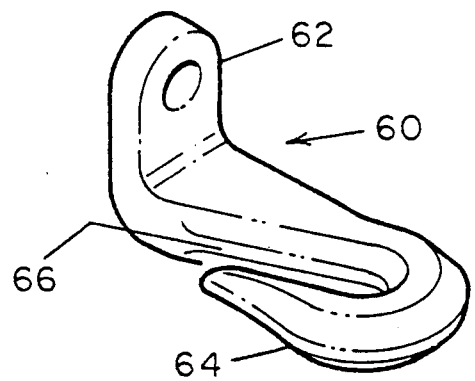
FIG. 6 is a perspective view of a further embodiment of a hook according to the invention.
Figure 8:
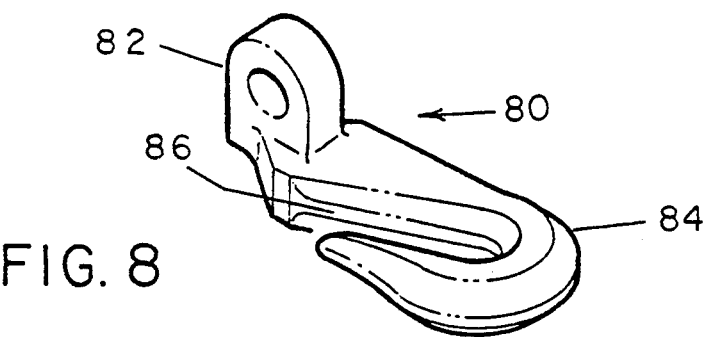
FIG. 8 is a perspective view of a further embodiment of a hook according to the invention.

FIG. 6 shows a further hook 60 having an eyelet type attachment end 62 and a hook end 64 in which lies a slot 66 defining a plane. The attachment end 62 lies outside of the plane of the hook end 64. FIG. 7 shows a similar hook 70 to that of FIG. 6 with attachment end 72 and hook end 74, but the hook shows a different configuration of the shank. FIG. 8 also shows a hook 80 having an eyelet type attachment end 82 and a hook end 84 in which lies a slot 86 defining a plane. The eyelet is more or less perpendicular to the plane of the hook end. The attachment end lies out of the plane of the hook end.

Figure 9:
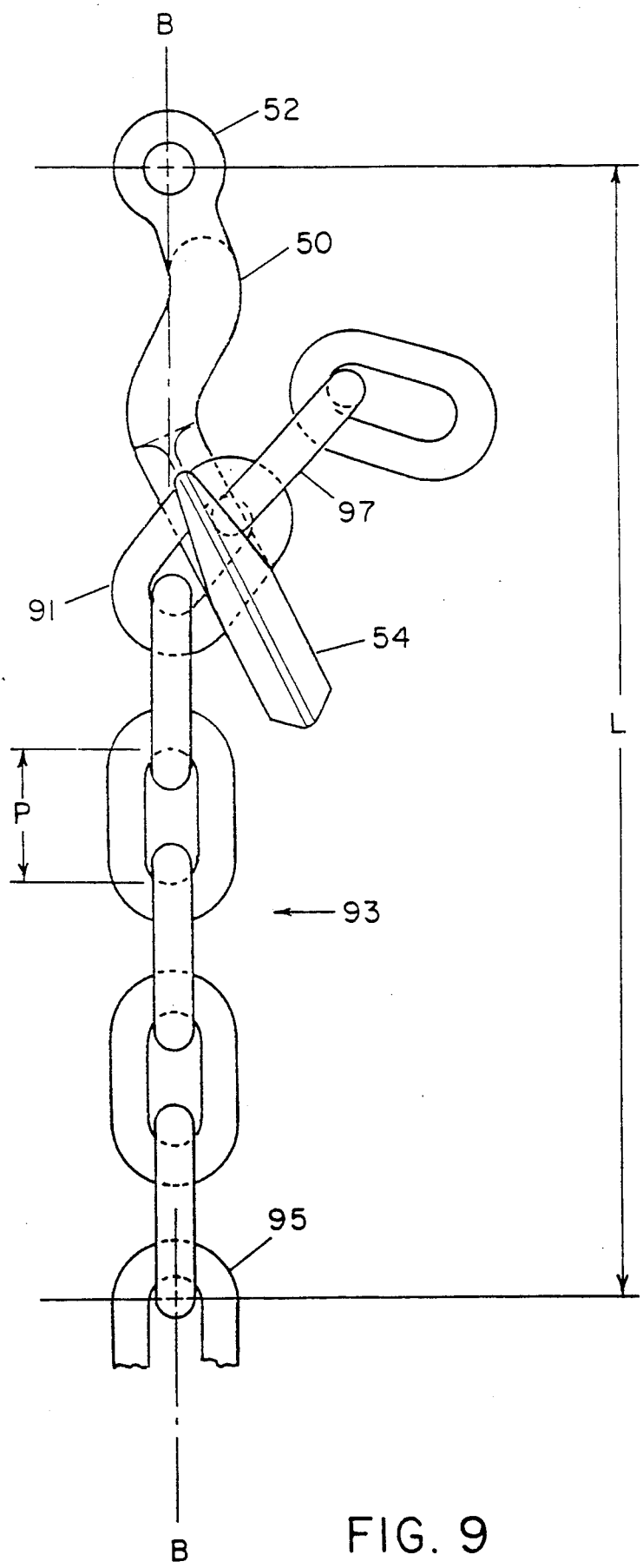
FIG. 9 is a side view of a hook according to the invention attached to a chain in one way showing a longer length of the L between a specific link in the chain and the attachment point of the hook.
Figure 10:
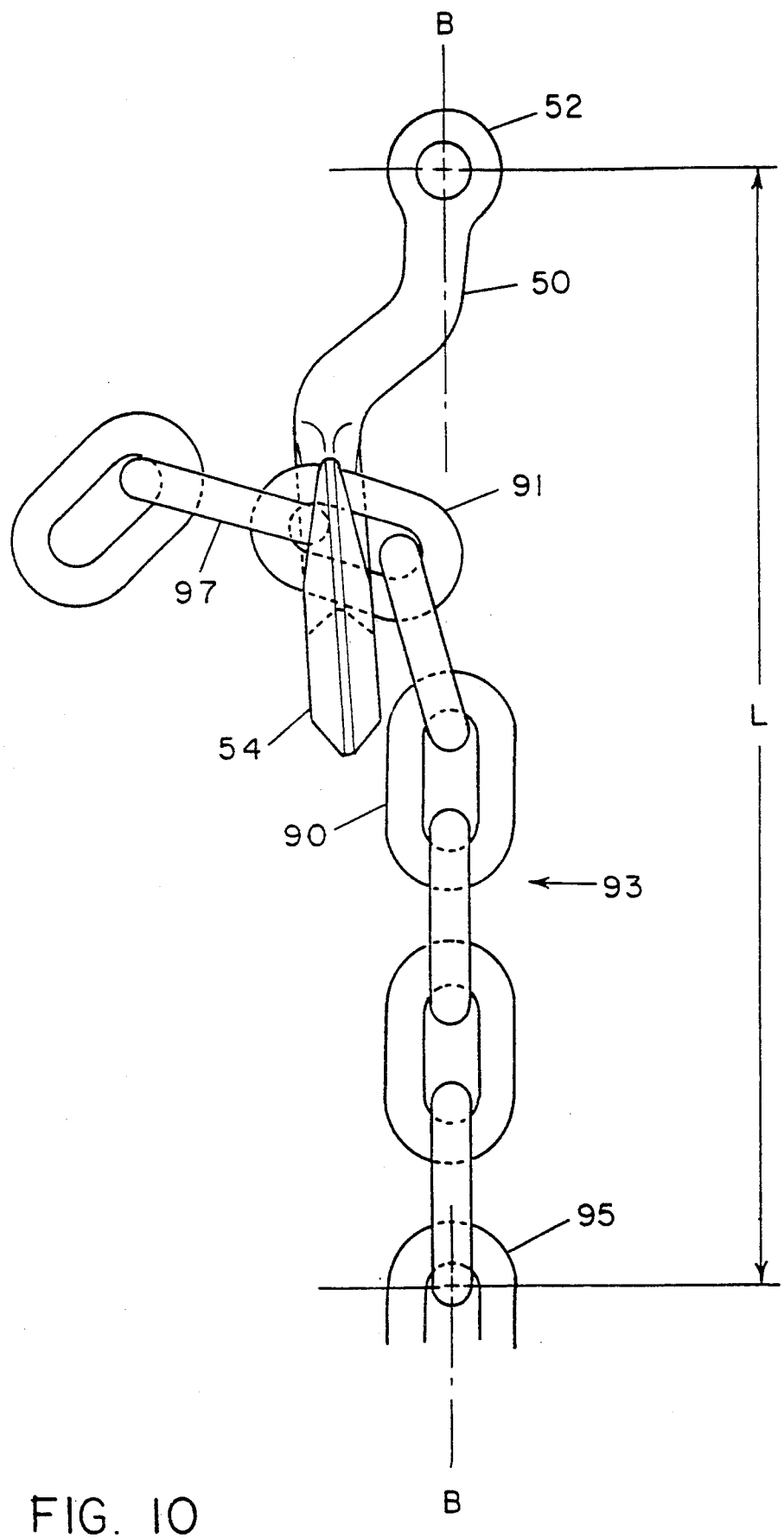
FIG. 10 is a s view of the hook of FIG. 9 attached to a chain in another way showing a shorter length of the distance L.

FIGS. 9 and 10 show a hook 50 of the type shown in FIGS. 2, 3 and 4 attached to a link 91 of a chain 93. The load is being tightened along the line B—B which passes through the main portion of the chain 93 and the attachment end 52 of the hook. Since the plane of the hook end 54 is offset, it cannot lie along the line B—B (otherwise the attachment end 52 would be in the plane of the hook end 54). FIGS. 9 and 10 show two possible positions for the hook 50 to lie in. The angle of the chain link 91 differs in the two positions and this changes the length of chain required to reach the slot 56. Thus, given a link in the chain 93 (link 95 for example), the distance L between it and the attachment end 52 may be changed by a part of the pitch of a link by moving the chain 93 from entering one side of the slot as shown in FIG. 9 to entering the other side shown in FIG. 10. In the example shown, the part of the pitch of a link is about one half of the pitch. Interference at the lower end 90 of the hook 50 in FIG. 10 also tends to shorten the chain (that is, lengthens the path that the chain takes).

The link 97 adjacent to the link 91 on the short end of the chain is the gripping link, and depending on which side the chain passes through, the link 97 will abut against one side of the hook end or the other. The length of the chain may also be changed slightly by making the hook end asymmetrical about the plane A, for example by thickening one side of the hook and thinning the other. While this manner of changing the chain length is not preferred, it may be used to enhance the operation of the invention. The pitch, shown as p in FIG. 9, of a link is the total length of the chain divided by the total number of links in that length of the chain.

Alternative Embodiments

A person skilled in the art could make immaterial modifications to the invention described and claimed in this patent without departing from the essence of the invention.

I claim:

1. In combination, a first chain having a gripping link, and a hook for attachment to the first chain and for attachment to a second chain or like member, the hook comprising:
    a body having a first end and a second end;
    the second end having attachment means for attaching the hook to the second chain or like member;
    the first end including a slot for receiving a link of the first chain adjacent the gripping link, the slot defining a plane; and
    the attachment means lying outside the plane of the slot, whereby depending upon the side of the hook the gripping link abuts against, the distance from the attachment means to a given point on the first chain may be a first distance or a second distance.

2. The combination of hook and chain in claim 1 in which the length of a link of the first chain is defined by its pitch and the difference between the first distance and the second distance is about half of the pitch of a link.

3. A method of attaching a hook to a first chain having a gripping link, the link having a longitudinal axis, in which the hook includes a body having a first end and a second end; the second end having attachment means for attaching the hook to a second chain or like member; the first end including a slot for receiving a link of the first chain adjacent the gripping link, the slot defining a plane and having a first side and a second side; and the attachment means lying outside the plane of the slot; the link being initially within the slot with the gripping link on the first side of the slot; the method comprising the steps of:
    removing the link from the slot, rotating the link 180° about an axis perpendicular to the longitudinal axis of the link and inserting the link back into the slot with the gripping link on the second side of the slot, thereby changing the distance from the attachment means to a given point on the first chain from a first distance to a second distance.

* * * * *

UNITED STATES PATENT AND TRADEMARK OFFICE
CERTIFICATE OF CORRECTION

PATENT NO. : 5,173,998
DATED : Dec. 29, 1992
INVENTOR(S) : Douglas J. MacKenzie It is certified that error appears in the above-identified patent and that said Letters Patent is hereby corrected as shown below:

Column 1 Line 63 should read:

way of illustration, in which like numerals denote like elements and in which:

Column 2 Line 7 should read:

of a hook according to the invention;

Signed and Sealed this

First Day of February, 1994

*Attest:*

BRUCE LEHMAN

*Attesting Officer*     *Commissioner of Patents and Trademarks*